Aug. 27, 1957  H. A. WISTRICH ET AL  2,804,379
FLUID MIXER WITH ROTATING BAFFLES
Filed June 21, 1956  2 Sheets-Sheet 1

INVENTORS:
HARRY A. WISTRICH
RICHARD B. OLNEY
BY: *Oswald H. Wilmore*
THEIR ATTORNEY

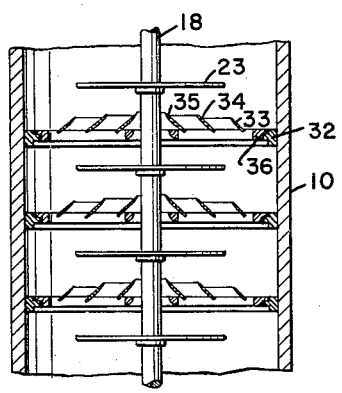
FIG. 4
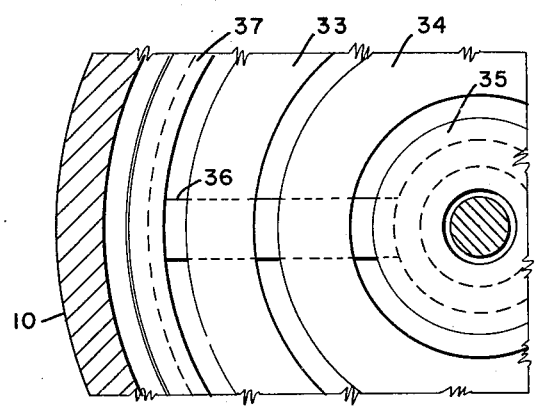
FIG. 6
FIG. 5
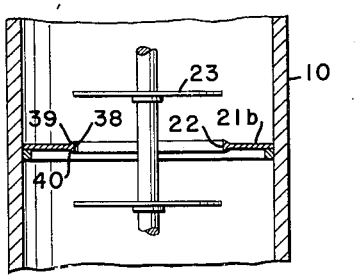
FIG. 7
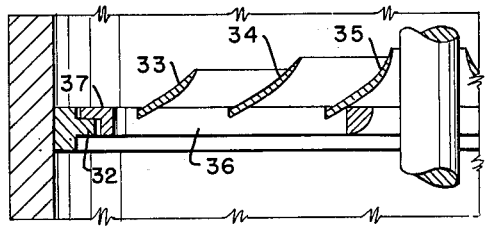
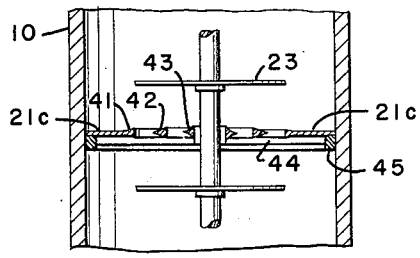
FIG. 8
INVENTORS
HARRY A. WISTRICH
RICHARD B. OLNEY
BY Oswald H. Wilmore
THEIR ATTORNEY

United States Patent Office 2,804,379
Patented Aug. 27, 1957

2,804,379

FLUID MIXER WITH ROTATING BAFFLES

Harry A. Wistrich, Walnut Creek, and Richard B. Olney, Oakland, Calif., assignors to Shell Development Company, New York, N. Y., a corporation of Delaware Application June 21, 1956, Serial No. 592,981

10 Claims. (Cl. 23—270.5)

This invention relates to internally baffled, multistage fluid mixing apparatus suitable, for example, as reactors or as contacting apparatus to effect intimate contact between two or more at least partially immiscible fluid phases. When used as a reactor a single fluid phase may be passed through the central stages; the device then is a homogeneous reactor. However, several phases may be flowed through the reactor concurrently. When used as a contacting device, e. g., to effect chemical reactions or for solvent extraction, two phases are present, and usually flow countercurrently through the several stages. All applications are herein generically referred to as fluid mixing apparatus.

Mixing apparatus of this type have a series of annular stator baffles having central openings and mounted at intervals transversely within an elongated vessel, which is usually vertical, and a rotor which includes a shaft extending through the said openings and carrying fast for rotation therewith a plurality of transverse, generally flat rotor baffles distributed among the compartments defined by the stator baffles and so mounted that they are axially spaced from the adjacent stator baffles, with which they cooperate to form mixing zones. Such apparatus is sometimes known as a rotating disc contactor. The general principles of construction and operation and the vortex patterns created by the baffles when used as a contactor are disclosed in U. S. Patents Nos. 2,601,674, 2,729,544 and 2,729,545 and will not be described in detail herein.

As is more completely set forth in the cited patents, the rotor baffles produce within the several compartments vortex patterns which cause one phase to be dispersed intimately within the other, and the dispersed and continuous phases gravitate into adjoining compartments in accordance with their relative densities. Such gravitating flow is satisfactory when the operation involves reasonably balanced net rates of flow of the two phases countercurrently through the vessel. In some operations, however, the net or throughput rate of flow of one of the phases, either the dispersed or the continuous one, is insufficient to maintain a composition gradient through the series of compartments when known constructions of the apparatus are used. For example, it was found that when one phase flows only intermittently or very slowly, such as at one-tenth of the flow rate of the other, excessive axial mixing occurs. The composition of the slowly moving phase then tends to become or becomes uniform throughout the several compartments, so that the contactor is in effect operating at a very small number of stages or as a single stage; this phenomenon occurs although the same contactor can be operated at a larger number of theoretical stages with the identical ratio of phases present within the vessel but with increased flow of the above-mentioned phase. The difficulty is especially severe in fluid systems that are difficult to mix; in such cases high mixing intensities produced, e. g., by high rotor speeds, are necessary and promote equalization of the composition throughout the several compartments.

The situation of low net rate of flow of one phase, considered in the preceding paragraph, is met with whenever a fluid stream is treated with a disproportionately smaller volume of a treating fluid, e. g., when hydrocarbon oil is treated with sulfuric acid or gasoline is treated with caustic.

Axial mixing is also a problem when the device is used as a reactor wherein only one phase occurs or wherein several phases flow concurrently, since any passage of fluid counter to the main flow direction results in unequal residence times for different parts of the reaction mixture.

It is a general object of the invention to overcome the above-noted difficulty by providing a deflecting body in the vessel in such a way as to limit axial fluid mixing. Specific objects are to limit back-mixing of the slowly moving phase and thereby to increase the number of theoretical contacting stages realized when internally baffled apparatus of the type indicated is used as a contacting apparatus when the rate of throughput of one phase is excessively low in relation to the rate of throughput of the other phase and when a high mixing intensity is required; and to limit back-mixing of the fluid passing through the vessel when used as a homogeneous or concurrent-flow reactor so as to effect a more uniform residence time.

In summary, according to the invention the general object is attained by mounting at the opening in the stator baffle between a pair of compartments a body having a deflecting surface which deflects the inward fluid currents axially toward the center of the compartment and thereby decreases the tendency of the fluid to flow into the adjoining compartment. Several arrangements of the deflecting structure may be used. In one embodiment the deflecting body is a lip at the inner edge of the stator baffle, preferably curved and in streamlined relation thereto. The fluid which, due to the double vortex flow patterns inherent in such apparatus, flows along the stator baffle from the vessel wall inwards toward the axis, are thereby deflected in the general direction of the vessel axis and away from the adjoining compartment. This general direction is usually the same as the main flow direction of the fluid wherein back-mixing is to be suppressed. In another arrangement, which can be used alone or in conjunction with that just described, one or more deflectors are mounted within the opening in the stator baffle, in spaced relation to one another and to the stator baffle, so as not to obstruct the passage between the adjoining compartments while yet providing inclined surfaces for deflecting the inwardly moving fluid. The deflecting bodies suitably have inclined surfaces of revolution about the central axis of the vessel, or the said surfaces are portions of such a surface of revolution. According to a further variant deflecting surfaces are provided on opposite sides of the deflecting body, to act respectively on the fluids flowing on the opposite sides of the stator baffle within adjoining compartments and to deflect the said fluids in divergent axial direction.

The axial deflecting action described in the foregoing paragraph directs the fluid away from the adjoining compartment; this lessens the tendency for the fluids in the adjoining compartments to become commingled and thereby reduces the inter-compartment fluid intermixing rate.

It should be noted that the reduction of inter-compartment fluid intermixing brought about by the deflecting bodies can be applied to all of the stator baffles, thereby achieving a high degree of differentiation between compartments. More usually, however, the deflectors are applied at only selected stator baffles; this has the advantage of presenting the minimum obstruction to the flow of the fluids through the vessel.

The invention is founded on the observation that the tendency of a phase, such as the slowly-moving phase in a contacting operation, to become uniform throughout the series of contacting compartments is due to back-mixing, in which some of the said phase flows between compartments in the reverse axial direction, i. e., toward the end of the vessel at which it was admitted. When this axial mixing occurs at a rate that is high in relation to the net rate of flow or throughput rate of the phase in question, the composition is more or less equalized among all or several compartments. The rate of axial or back-mixing can be expressed in terms of the inter-compartment fluid intermixing rate, which is defined as the ratio of the reverse flow of a given fluid phase between adjacent compartments to the net forward flow of said phase through the vessel. In general, higher mixing intensities result in higher inter-compartment mixing rates. It is evident that the same condition prevails in the case of a uniflow reactor; here reverse flow leads to a wider spread between the maximum and minimum residence times within the reactor.

The instant invention purports to maintain good mixing or contacting conditions within the compartments and to separate these zones from one another by the deflecting bodies. By this arrangement the maximum useful mixing intensity is no longer limited by the need to avoid excessive back-mixing. The apparatus, therefore, brings about the more uniform forward flow of one or both of the fluids and insures the existence of different compositions in the several high-intensity mixing zones. The degree of composition difference to be attained can be varied by changing the sizes and inclinations of the deflecting bodies.

The invention will be described as applied to apparatus wherein all compartments have rotor discs, all rotor baffles are of like size and small enough to pass through the central openings in the stator baffles, and all stator baffles are alike; these are not, however, absolute requirements for the utility of the instant invention.

The invention will be described in further detail with reference to the accompanying drawing forming a part of this specification and showing certain preferred embodiments by way of example, wherein:

Figure 1 is a vertical sectional view of the contacting apparatus constructed in accordance with the invention;

Figures 2 and 3 are transverse sectional views taken on the lines 2—2 and 3—3 of Figure 1;

Figure 4 is a fragmentary vertical sectional view showing an alternative construction;

Figure 5 is an enlarged, vertical sectional view of a portion of Figure 4, showing the mounting of the deflector rings;

Figure 6 is a plan view corresponding to Figure 5; and

Figures 7 and 8 are fragmentary vertical sectional views showing two further alternative constructions.

Figure 1:
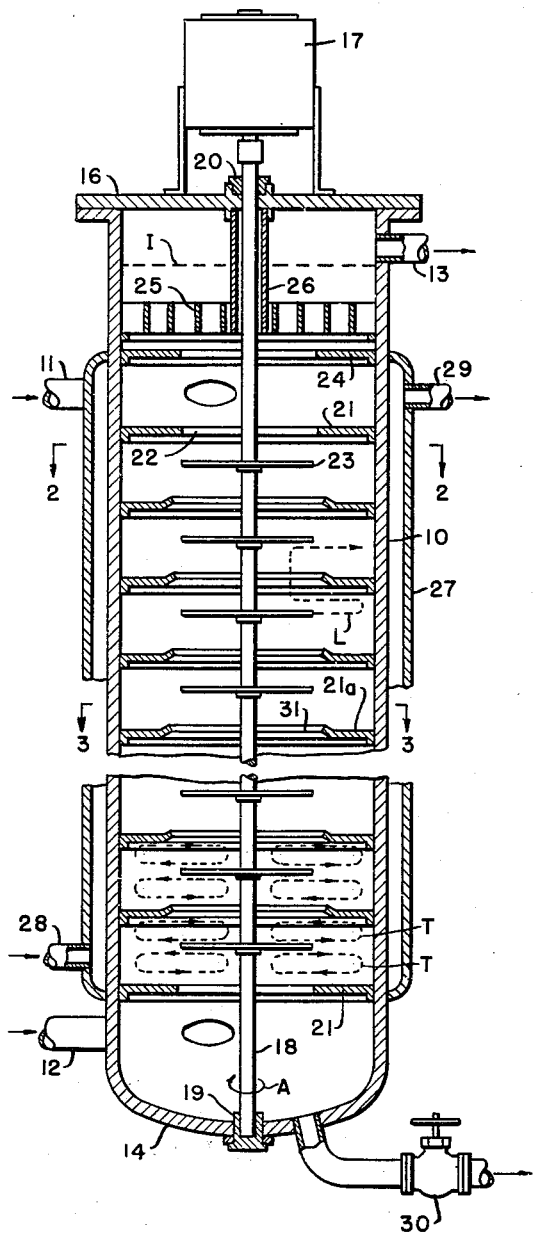
Figure 2:
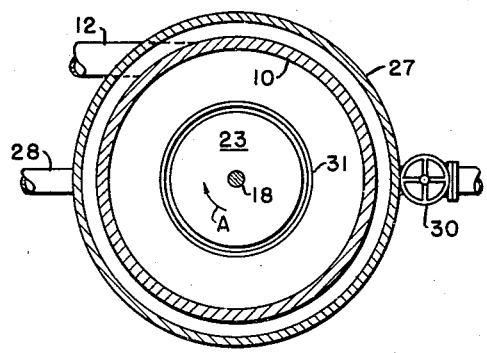
Figure 3:
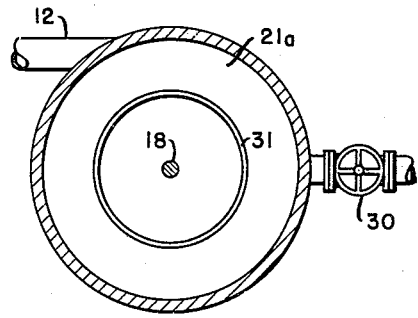

Referring to Figures 1, 2 and 3, the vessel includes a vertical cylindrical wall 10, circular in cross section, having upper and lower inlet pipes 11 and 12, respectively, which may optionally be tangential, as shown; an upper discharge pipe 13 and, in the bottom wall 14, a lower discharge pipe 15. The vessel is closed by a top plate 16 carrying an electric motor 17 which is coupled to a central, vertical shaft 18. This shaft is rotatably mounted in bearings 19 and 20. A plurality of horizontal, flat, annular stator baffles 21 or 21a is mounted immovably within the vessel at suitable intervals, which are equal in this embodiment. These baffles are imperforate except for central, circular openings 22, which are large in relation to the cross section of the shaft. The baffles divide the vessel into a vertical series of compartments which communicate consecutively through said openings. The shaft 18 carries fixed thereto a plurality of rotor baffles 23 in the form of flat, circular, imperforate discs, the shaft and rotor baffles together constituting the rotor. In the embodiment being described the diameters of the openings 22 are equal, as are those of the baffles 23, the latter being somewhat smaller so that baffle 23 can be passed through the openings; however, these features are not in every case essential to the invention. A stator baffle 24 and a current-suppressing element such as an egg-crate structure 25 may be optionally mounted above the inlet 11. Further, a tube 26 may surround the upper part of the shaft 18. The vessel may have a jacket 27 fitted with pipes 28 and 29 for the circulation of a heating or cooling fluid.

Considering now the improvement according to this embodiment of the invention, it will be noted that each intermediate stator baffle 21a, although generally flat, has an upwardly inclined, annular lip 31. The lips 31 may be shaped as continuous bodies of revolution, as shown. They serve to deflect upwards, toward the centers of the respective compartments, the fluids moving along the upper faces of the baffles 21a inwards from the wall 10 toward the shaft 18.

Operation as a contactor is as follows: It is assumed that the heavier fluid is to form a continuous phase and that the lighter fluid is to be dispersed therein. The column is filled through inlet 11 with the heavier fluid, the shaft 18 is rotated by the motor 17 in a direction indicated by the arrow A (this being preferably the same as the tangential direction of the inlet ports 11 and 12) and the lighter fluid is admitted continuously or intermittently through the inlet 12, the admission of heavier fluid at 11 being continued. Toroidal vortices T are thereby set up with each compartment, resulting in the dispersion of the lighter fluid in the heavier. The greater part of the dispersion is recirculated within the vortices and the balance gravitates from stage to stage. Thus, the net path for a particle of lighter fluid between compartments is as indicated by the dashed line L. These flow patterns are further described in the above-cited patents. The relatively quieter space beneath the lowermost baffle 21 contains only the heavier fluid, commingled above the inlet 12 with large bubbles or globules of the lighter fluid. The heavier fluid is discharged through the outlet at a rate controlled by the valve 30. The dispersion rising past the upper inlet 11 has the rotational movement thereof checked by the structure 25; this permits the dispersed droplets to settle above the interface I. The lighter fluid is withdrawn through the outlet 13 and the heavier fluid settles back through the structure 25, so that there is no net vertical flow thereof at this level.

As was noted earlier, when one of the fluid phases flows slowly or intermittently, back-mixing, i. e., axial mixing thereof in the reverse direction would tend to equalize among the several compartments the composition of that phase when the rotor baffles are operated at rotor speeds sufficient for good mixing without special measures against back-mixing. This tendency is effectively counteracted by the instant arrangement in that each lip 31 serves to deflect upwardly the inwardly flowing current of the lower toroidal vortex T. This limits axial mixing of both fluids through the opening adjoining the lip 31; however, it is preferred to dispose it to deflect the fluids toward the end of the vessel at which the fluid in which back-mixing is a problem, usually the slowly-moving fluid, is discharged, or, in the case of a uniflow reactor, toward the discharge end. Thus, the arrangement shown is particularly designed for the case in which the slowly-moving fluid ascends. It may be noted that either the ascending, dispersed phase or the descending, continuous phase may be that which flows through the vessel at the lesser rate.

While the foregoing description pertained to the dispersal of the lighter fluid, it is evident that the invention is equally applicable to the case where the heavier fluid is dispersed, as is disclosed in the aforementioned patents. In this case the baffle 24 and structure 25 are mounted at the bottom, below the inlet 12, and the interface I is situated below the said structure. Dispersion of the heavier fluid is effected by admitting it only after the vessel has been filled with the lighter fluid.

It may be further noted that the invention may be applied to contactors of various forms, including particularly those with streamlining bodies or flat guide rings, in accordance with the above U. S. Patents, Nos. 2,729,544 and 2,729,545, respectively.

Moreover, it is not essential to provide the lips 31 on all intermediate stator baffles; only occasional baffles may have deflectors, as shown in the subsequent embodiments.

The additional views of the drawing illustrate certain specific modified arrangements of deflecting bodies.

Referring to Figures 4, 5 and 6, the column 10 contains vertically spaced, annular rings 32, a rotor shaft 18, and rotor baffles 23, as previously described. The deflecting bodies in this embodiment are spaced rings 33, 34 and 35, disposed concentrically to the shaft 18. They may be supported in any suitable manner, such as by a plurality of narrow, radial arms 36 which are carried by a flanged support plate 37 resting on the adjacent ring 32. Each combination of a ring 21 and plate 37 forms a flat stator baffle. The rings 33—35 have smooth surfaces of revolution which are inclined to the horizontal and, preferably, curved in cross section, as viewed in Figures 4 and 5, and their outer edges are situated approximately in the horizontal plane of the stator baffle. They are advantageously thin, so as not to substantially obstruct the free communication between adjoining compartments. Moreover, the slope of the inner edge of each ring may be greater than that of the next outer ring, as shown.

The deflecting rings 33—35 serve to deflect axially upward the fluid currents moving along the upper surfaces of the stator baffles (which include the rings 32 and plates 37), to reduce the tendency of such fluid to intermix with that in the next lower compartment. The operation is similar to that previously described for Figures 1–3.

According to a further variation, pairs of deflecting surfaces may be provided at each opening, to deflect both of the fluid streams which travel in adjacent compartments on opposite sides of the same stator baffle. Such constructions are illustrated in Figures 7 and 8.

In Figure 7 each stator baffle 21b has a widened inner part 38 at the edge of the opening 22, extending both above and below the flat part of the baffle, so as to provide opposed deflecting surfaces 39 and 40.

In Figure 8 each of the deflecting rings 41, 42 and 43 has a sharp outer edge, situated approximately at the mid-level of the stator baffle 21c, and extends both above and below the said edge to act as double deflectors. These rings are shown to be supported by thin radial arms 44 which are fixed to the baffles 21c. The latter rest on support rings 45.

The considerations noted above apply also when the device is used as a reactor. Thus, when used as a homogeneous reactor only one set of flow connection, 12 and 13 or 11 and 15, is needed, and the rotor is used for the purpose of mixing the reacting stream to establish within each compartment uniformity in composition and temperature, the latter being controlled by the temperature of fluid circulated within the jacket 27.

We claim as our invention:

1. A fluid mixing apparatus comprising: an axially elongated vessel; a plurality of transverse, axially spaced, annular stator baffles having opposed faces and openings therein fixed within said vessel and defining a series of compartments which are in consecutive communication through said openings; means for admitting a fluid to the vessel at one end of the series and for discharging the fluid at the other end of the series; a rotor including a rotatably mounted shaft extending through said openings with ample radial clearances and carrying fast for rotation therewith a plurality of rotor baffles, each rotor baffle being situated within one of said compartments in axially spaced relation to the stator baffles; and deflecting means including a deflecting body which has a surface situated at an opening of an intermediate stator baffle and inclined to the plane of the stator baffle so as to deflect in an axial direction the fluid that moves inwardly along said stator baffle.

2. A fluid mixing apparatus according to claim 1 wherein said deflecting body is a lip at the inner edge of the baffle.

3. A fluid mixing apparatus according to claim 1 wherein said deflecting body is situated in spaced relation radially inwards from the inner edge of the said stator baffle.

4. A fluid mixing apparatus according to claim 3 wherein said deflecting means includes a plurality of generally frusto-conical bodies disposed in spaced relation concentrically with said shaft.

5. A fluid mixing apparatus according to claim 3 wherein said deflecting body has a pair of opposed, inclined deflecting surfaces projecting respectively axially into adjacent compartments.

6. A fluid contacting apparatus comprising: a vertically elongated vessel shaped internally as a surface of revolution about a vertical axis; a plurality of horizontal, generally flat annular stator baffles fixed within said vessel and extending at vertical intervals from said interior surface radially to central, circular openings, said baffles defining a series of compartments which are in consecutive communication through said openings; means for admitting fluids to be contacted at vertically spaced points in said vessel for countercurrent flow through said compartments and for discharging the fluids after such countercurrent flow; a shaft extending through said openings with ample radial clearances; means mounting said shaft for rotation; a horizontal, substantially flat, circular rotor baffle for each of said compartments mounted on said shaft for rotation therewith at locations spaced by substantial axial distances from the adjacent higher and lower stator baffles; and a deflecting body having a surface situated at the level of an intermediate stator baffle and shaped at least in part as a surface of revolution, said surface being inclined with respect to the plane of said intermediate stator baffle so as to deflect in an axial direction toward the interior of a compartment the fluid that moves within said compartment inwardly along said stator baffle.

7. A fluid contacting apparatus according to claim 6 wherein said deflecting body is an annular lip situated at the inner edge of said stator baffle and inclined to the horizontal.

8. A fluid contacting apparatus according to claim 6 wherein said deflecting body is situated within the opening in said intermediate stator baffle in radially spaced relation to the edge thereof.

9. A fluid contacting apparatus according to claim 8 wherein said deflecting body includes a plurality of radially spaced, concentric louvered rings.

10. A fluid contacting apparatus according to claim 9 wherein said rings have opposed, inclined, annular surfaces directed respectively into the adjacent compartments which are on opposite sides of said intermediate stator baffle.

No references cited.